Jan. 18, 1944.  J. E. HALE  2,339,558
TIRE
Filed March 21, 1942   2 Sheets-Sheet 1
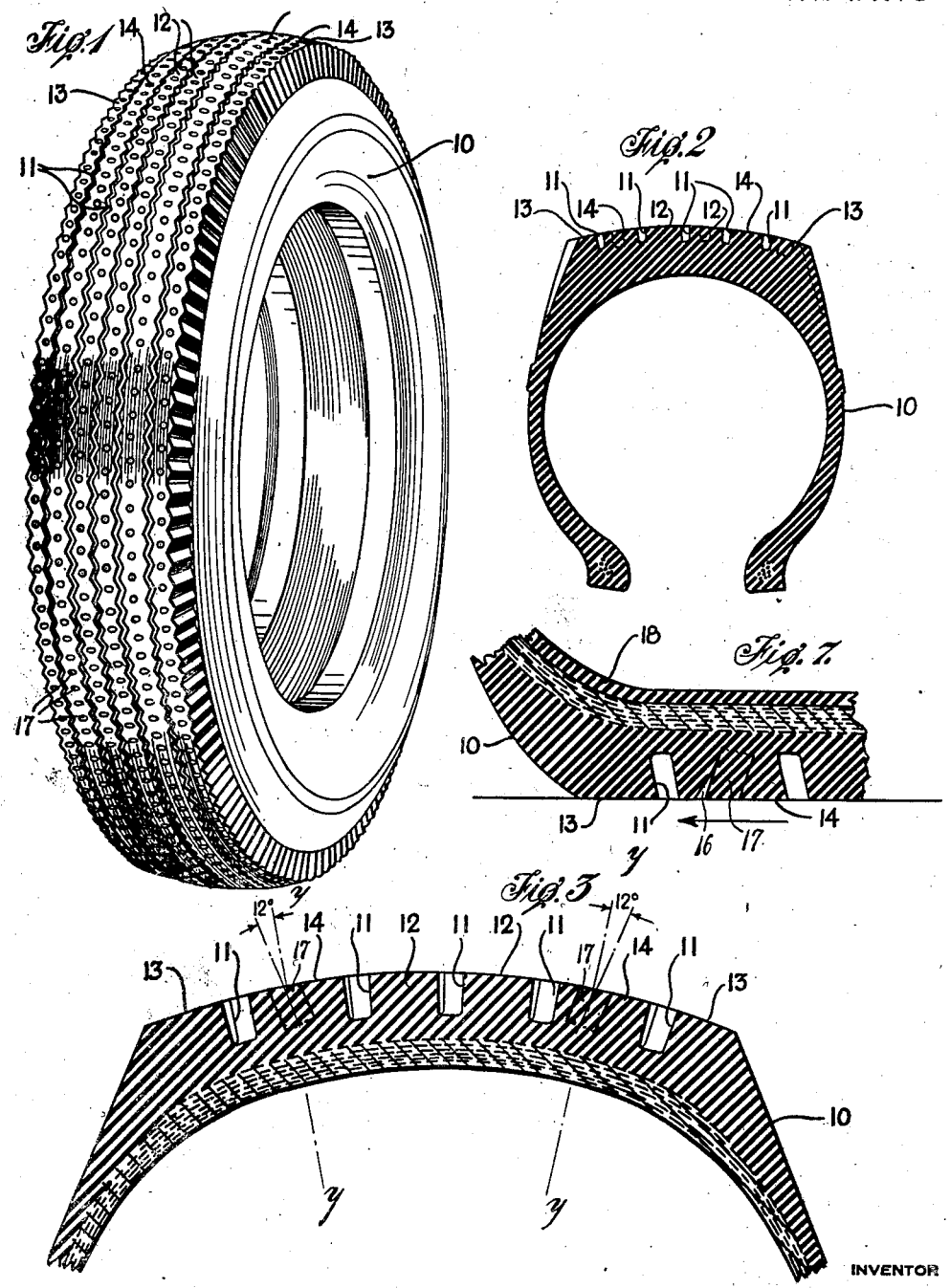
INVENTOR
JAMES E. HALE
BY
Cly & Frye
ATTORNEYS

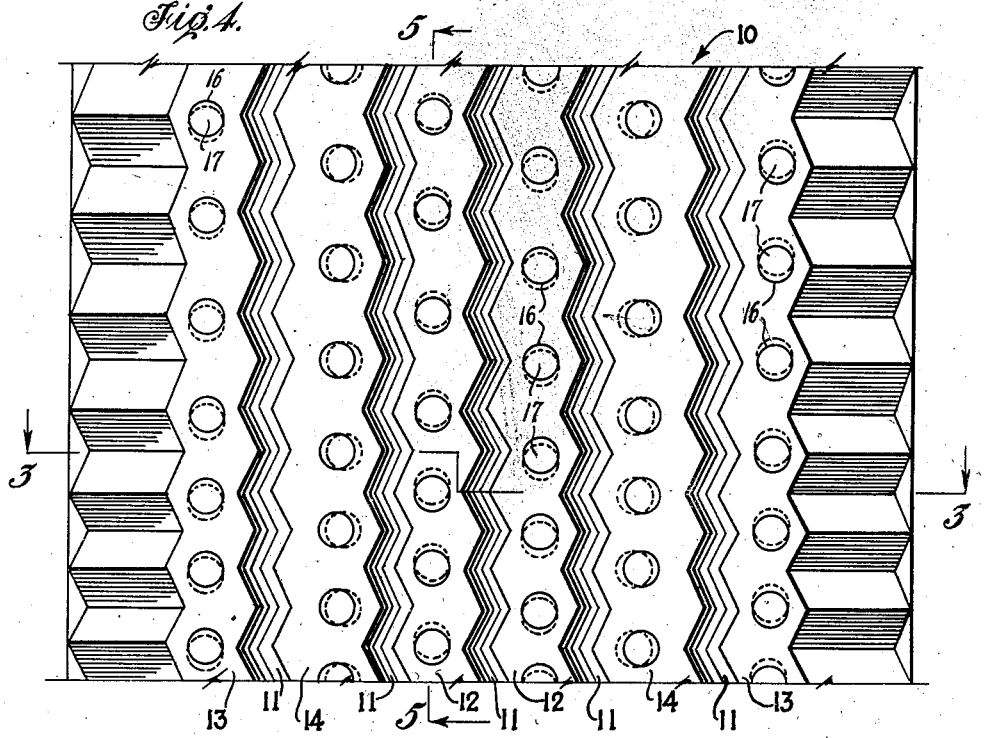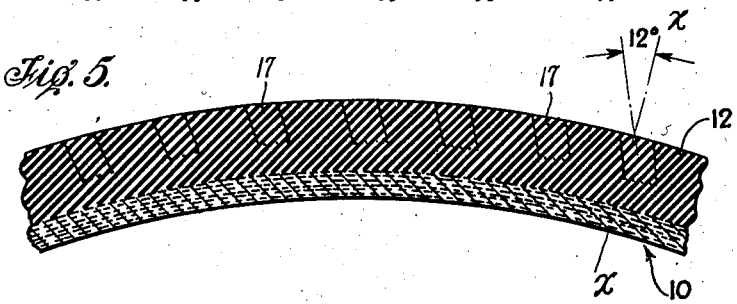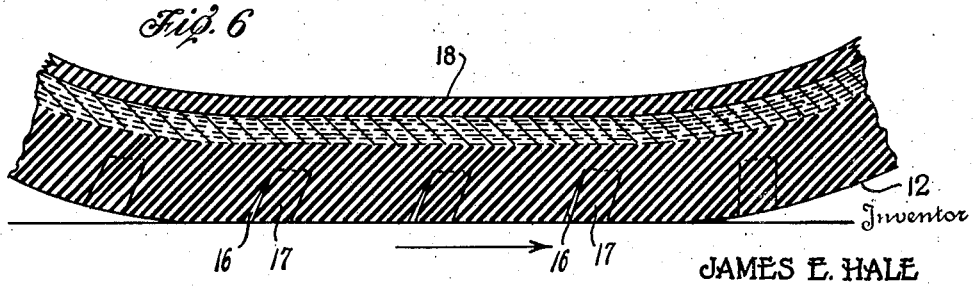

Patented Jan. 18, 1944

2,339,558

UNITED STATES PATENT OFFICE 2,339,558

TIRE

James E. Hale, Akron, Ohio, assignor to The Firestone Tire & Rubber Company, Akron, Ohio, a corporation of Ohio Application March 21, 1942, Serial No. 435,645

2 Claims. (Cl. 152—209)

This invention relates to vehicle tires of rubber or rubber-like composition, and more especially it relates to tires of the character mentioned wherein the tread portion thereof is slitted.

Experience has shown that the tractive characteristics of rubber tires are improved by the cutting, slitting, or incising of the tread portion of tires without the removal of tread material from such incisions. Furthermore, it has been found that the arrangement of the incisions with relation to each other and with relation to the tire tread, and the configuration of the latter, are factors that affect the functioning of the incisions as a traction aid. Consequently a considerable number of arrangements and designs for tread-incisions heretofore have been proposed, among which may be mentioned incisions arranged in parallelism, incisions intersecting each other, and incisions defining geometric figures such as triangles, diamonds and circles. Such incisions, however, invariably have been disposed substantially radially of the tire, with the result that they are perpendicular to the surface of the tire tread.

The chief objects of the present invention are to provide a vehicle tire having improved skid-resisting characteristics; to provide in a simple manner for improving the skid-resistance of vehicle tires having a slitted tread portion; and to ding both forwardly and backwardly, and to either side. Other objects will be manifest as the description proceeds.

Of the accompanying drawings:

Fig. 1 is a perspective view of a vehicle tire casing embodying the invention;

Fig. 2 is a transverse section thereof;

Fig. 3 is a transverse section of the tread portion of the tire, on a larger scale, taken on the line 3—3 of Fig. 4;

Fig. 4 is a developed plan view of a portion of the tread of the tire;

Fig. 5 is a section on the line 5—5 of Fig. 4; and

Fig. 6 and Fig. 7 are fragmentary sectional views showing the action of the skid-resisting elements of the tire when the latter is under stress.

Referring to the drawings, there is shown a vehicle tire casing 10 of any known or preferred internal construction, and provided with the usual thickened tread portion on the periphery thereof. The said tread is formed with traction elements, which elements are shown herein as consisting of a plurality of circumferentially extending, continuous ribs that are separated by intervening circumferential grooves 11, 11. As shown, the said ribs are six in number, and for convenience are designated as medial ribs 12, 12, lateral ribs 13, 13, and intermediate ribs 14, 14, one of the latter being disposed between each medial rib 12 and lateral rib 13. The lateral margins of each of said ribs may be serrated as shown, the serrations of the confronting margins of adjacent ribs being so arranged that the grooves 11 present a zig-zag appearance. The tread configuration shown and described is presented solely for illustrative purposes, and it is to be understood that changes in the number of ribs and the design thereof may be made within the purview of the invention and within the scope of the appended claims.

As previously stated, the tread portion of the tire is slitted or incised, and the novel feature of the invention resides in the particular arrangement of the incisions in the tread of the tire. For the purpose of illustration, the incisions or slits in the tire tread are in the form of circles 16, since this form of incision has been found to have inherent advantages not present in other types of incisions. The circular incisions 16 extend a substantial distance into the tire tread, and define respective cylindrical plugs 17 that are unsevered from the tread structure at their inner ends, the outer ends of the plugs being flush with the surface of the tread. The slits 16 have no appreciable width, so that the slits are scarcely visible in the unstressed condition of the tire, and the walls of the slits are contiguous and in abutting condition. Under stress, as when the tire is skidding, or the car is being accelerated or decelerated, there occurs relative movement between the plugs 17 and the adjacent tread structure such as to effect the opening of the slits, and the presenting of sharp edges of the plugs to the roadway in a manner that improves the traction qualities of the tire, as presently will be explained. All of the incisions 16 are located in the ribs of the tire tread, and extend in circumferential series. Preferably the incisions of each series are in staggered or offset relation to the incisions of adjacent series, as is most clearly shown in Fig. 4.

A salient feature of the invention is the arrangement of the axes of the incisions 16 and plugs 17. In no case are these axes disposed radially or substantially radially of the major axis of the tire 10 or the cross-sectional axis thereof. Instead, they are disposed at determinate angles to said axes, and the inclination of the incisions and plugs from true radial position differs in the various series of incisions and plugs to provide a balanced construction whereby the improvement in traction characteristics and skid resistance is available in whatever direction the tire may be rolling or sliding.

As will be clear from reference to Figs. 4 and 5, the incisions 16 and plugs 17 that are located in the medial ribs 12 are obliquely disposed with relation to radii of the tire that radiate from the major axis thereof. Such a radius is indicated by the line X—X, Fig. 5 wherein it will be seen that the axis of each plug 17 is at an angle of 12 degrees to such a radius. All of the plugs in each series of plugs in the ribs 12 are inclined in the same direction with relation to the radii of the tire, but the plugs of one series, that is, in one rib 12, are oppositely inclined with relation to the plugs of the other rib 12, although the angle of inclination is the same, namely, 12 degrees. In like manner the incisions 16 and plugs 17 in the lateral ribs 13 are obliquely disposed with relation to radii of the tire, the inclination of the plugs in either rib 13 being in the same direction as in the medial rib 12 that is positioned farthest therefrom.

In the intermediate ribs 14, the incisions 16 and plugs 17 are obliquely disposed with relation to radii that radiate from the transverse axis of the tire, that is, the axis about which the normal transverse curvature of the tire tread is generated. The radii aforementioned are designated Y—Y, Fig. 3, and the plugs are disposed at an angle of 12 degrees to said radii. Furthermore, the inclination of the plugs in one of the ribs 14 is opposite in direction to the inclination of the plugs in the other rib 14, the arrangement being such that the inclination of the plugs 17, toward the outer ends thereof, is in the direction of the adjacent lateral margin of the tread.

In Fig. 6 the tire is shown in longitudinal section in actual operation while under load and traveling in the direction indicated by the arrow. An inner tube 18 is shown mounted within the tire casing. Fig. 7 is a similar view taken transversely of the tire when the latter is in operative position under load and is distorted by the application of a lateral force in the direction of the arrow, as when the automobile on which the tire is mounted is going around a corner.

As previously stated, when the tire is under stress due to skidding and the like, some of the plugs 17 are caused to move relatively of the surrounding tread structure so as to open their slits 16. This occurs, of course, only in that region of the tread that is in contact with the roadway. The plugs 17 function most efficiently when force applied to them urges them toward perpendicularity with relation to the roadway. This causes a plug to flex at its base so that its leading side moves away from its confronting wall so as to open the slit 16 thereat, and the inclination of the plug is such that the aforesaid movement tends to move the free end of the plug out of its normal position, wherein its end face is flush with the surrounding surface, to a position wherein its end projects from the surrounding surface. This movement of the plug is most pronounced at its leading side, with the result that the sharply pointed nose at the leading side of the plug is urged against the roadway, as is clearly shown in Figs. 6 and 7, to increase the friction of the tire upon the roadway and thereby to oppose skidding. The construction is especially advantageous when the tire is operating in snow or soft soil since the plugs are more readily projected beyond their normal flush positions in the tread.

Because the plugs 17 are inclined in different directions, they are adapted to function in the manner described no matter which direction the tire is moving. The arrangement makes for uniformity, and enables the tire to be mounted on a vehicle with either side facing outwardly.

Modification may be resorted to without departing from the spirit of the invention or the scope thereof as defined by the appended claims.

What is claimed is:

1. A tire comprising a tread portion having a multiplicity of circular slits therein arranged in a plurality of circumferential series, the axes of the slits in some of said series being inclined in fore and aft direction with relation to the surface of the tread, the axes of the slits in other series being inclined in direction transversely thereto.

2. A tire comprising a tread portion having a multiplicity of circular slits therein arranged in a plurality of circumferential series, the axes of the slits in one of said series at least being inclined forwardly with relation to the surface of the tread, the axes of the slits in another of said series at least being inclined rearwardly, the axes of another series being inclined toward one lateral margin of the tread, and the axes of another series being inclined toward the other lateral margin of the tread.

JAMES E. HALE.